(12) United States Patent
Sadri et al.

(10) Patent No.: US 10,731,978 B2
(45) Date of Patent: Aug. 4, 2020

(54) METHOD AND SYSTEM FOR MEASURING SEAL CONTACT

(71) Applicant: Ford Motor Company, Dearborn, MI (US)

(72) Inventors: Hossein J Sadri, Novi, MI (US); Steve Juszczyk, Walled Lake, MI (US)

(73) Assignee: Ford Motor Company, Dearborn, MI (US)

( * ) Notice: Subject to any disclaimer, the term of this patent is extended or adjusted under 35 U.S.C. 154(b) by 285 days.

(21) Appl. No.: 15/828,952

(22) Filed: Dec. 1, 2017

(65) Prior Publication Data

US 2019/0101385 A1 Apr. 4, 2019

Related U.S. Application Data

(60) Provisional application No. 62/565,485, filed on Sep. 29, 2017.

(51) Int. Cl.
*G01B 13/12* (2006.01)
*G01M 3/02* (2006.01)
(Continued)

(52) U.S. Cl.
CPC .............. *G01B 13/12* (2013.01); *B60J 10/18* (2016.02); *G01B 3/20* (2013.01); *G01B 5/0025* (2013.01); *G01M 3/02* (2013.01)

(58) Field of Classification Search
CPC ........ G01B 13/12; G01B 3/20; G01B 5/0025; G01M 3/02; B60J 10/80
(Continued)

(56) References Cited

U.S. PATENT DOCUMENTS 4,326,981 A 4/1982 Molina
6,308,429 B1 10/2001 Green et al.
(Continued)

FOREIGN PATENT DOCUMENTS

DE 202013005906 U1 * 7/2013
KR 101976859 B1 * 5/2019

OTHER PUBLICATIONS

UV Dye & UV Torch Kit Leak Detection Fluid for Water Ingress & Seal Leaks RLD3, available at URL https://www.amazon.co.uk/Torch-Detection-Fluid-Water-Ingress/dp/B00TUASBUC.
(Continued)

*Primary Examiner* — Nimeshkumar D Patel
*Assistant Examiner* — Nashmiya S Fayyaz
(74) *Attorney, Agent, or Firm* — Burris Law, PLLC

(57) ABSTRACT

The present disclosure is directed toward a method for measuring a seal gap between a closing member and a fixed member. The method includes applying a liquid agent having transferable properties along one or more regions of a stamping member to form one or more base marks. The stamping member is one of the closing member or the fixed member. The method further includes engaging the closing member with the fixed member, disengaging the closing member from the fixed member, and assessing a seal gap between the closing member and the fixed member based on one or more remnant patterns formed on an imprinted member. The imprinted member is the other one of the closing member and the fixed member, and the remnant patterns are formed by the transfer of the liquid agent from the base marks.

20 Claims, 7 Drawing Sheets

(51) Int. Cl.
*B60J 10/80* (2016.01)
*G01B 3/20* (2006.01)
*G01B 5/00* (2006.01)
*B60J 10/18* (2016.01)

(58) Field of Classification Search
USPC .............................. 73/865.8–865.9, 46, 37.5
See application file for complete search history.

(56) References Cited

U.S. PATENT DOCUMENTS

| | | |
|---|---|---|
| 6,549,875 B2 | 4/2003 | Hwang |
| 6,860,067 B2 | 3/2005 | Gearhart et al. |
| 8,286,362 B2 | 10/2012 | Petersheim |
| 9,116,067 B1 | 8/2015 | Reid |
| 2003/0232189 A1* | 12/2003 | Gearhart ................ B60J 10/00 428/343 |

OTHER PUBLICATIONS

Complete LeakFinder Wind & Water Kit, Tracer Products product page, at URL http://tracerline.com/product/tp-8648/.

* cited by examiner

METHOD AND SYSTEM FOR MEASURING SEAL CONTACT

CROSS-REFERENCE

This application claims the benefit of and priority to U.S. Provisional Application No. 62/565,485 filed on Sep. 29, 2017. The disclosure of the above application is incorporated herein by reference.

FIELD

The present disclosure relates to a method and system for measuring a seal contact as it relates to seal gap in a vehicle.

BACKGROUND

The statements in this section merely provide background information related to the present disclosure and may not constitute prior art.

A vehicle includes many closure panels (i.e., a closing members) that are operable to open and close against a body of the vehicle (i.e., vehicle body or fixed member). For example, the doors, trunk, hood, sunroof panel, and deck lid are all closure panels that mate with the vehicle body. To prevent debris from entering between the closure panel and the vehicle body (i.e., between two mating members), weather-strips or seals are typically arranged between the two mating members to seal against debris, such as water. In addition to sealing against debris, the seals also control wind noise that is caused by air passing through the two mating members.

Typically, the amount of interference between the seal and the surface upon which it seals, controls wind noise and debris leakage. The interference can also affect the amount of effort (i.e., energy) required by a user to close the closure panel onto the vehicle body. Specifically, as the amount of interference between the seal and the surface increases, the amount of effort needed to close the panel also increases. These and other issues are addressed by the present disclosure.

SUMMARY

This section provides a general summary of the disclosure, and is not a comprehensive disclosure of its full scope or all of its features.

In one form, the present disclosure is directed toward a method for measuring a seal gap between a closing member and a fixed member. The method includes applying a liquid agent having transferable properties along one or more regions of a stamping member. The stamping member is one of the closing member and the fixed member. The method further includes engaging the closing member with the fixed member, disengaging the closing member from the fixed member, and assessing a seal gap between the closing member and the fixed member based on one or more remnant patterns formed on an imprinted member that is the other one of the closing member and the fixed member. The one or more remnant patterns are formed by the liquid agent transferred from the stamping member.

In another form, the method further includes removing the liquid agent from the stamping member and the imprinted member.

In yet another form, the assessing the seal gap further includes performing a visual inspection of the one or more remnant patterns, and determining that the seal gap is within a preset tolerance when a size of a remnant pattern among the one or more remnant patterns is larger than a known reference.

In one form, the assessing the seal gap further includes measuring a dimension of at least one of the one or more remnant patterns, and determining that the seal gap is within a preset tolerance when the measured dimension exceeds a set threshold.

In another form, the closing member and the fixed member are a door assembly and a door opening defined by a vehicle body, respectively.

In yet another form, the liquid agent is a washable paint.

In one form, the liquid agent is applied to a seal disposed on the stamping member.

In one form, the present disclosure is directed toward a method for measuring a seal gap between a closing member and a fixed member, and the method includes printing, with a liquid agent, a base mark on a stamping member. The stamping member is one of the closing member and the fixed member. The method further includes closing the closing member onto the fixed member, opening the closing member, and analyzing a remnant pattern formed on an imprinted member by the transfer of the liquid agent from the base mark to measure the seal gap between the closing member and the fixed member. The imprinted member is the other one of the closing member and the fixed member.

In another form, the method further includes erasing the base mark and the remnant pattern.

In yet another form, the base mark is printed on a seal that is attached to the stamping member.

In one form, the remnant pattern is formed on a seal that is attached to the imprinted member.

In another form, the closing member is the stamping member and the fixed member is the imprinted member.

In yet another form, the closing member is the imprinted member and the fixed member is the stamping member.

In one form, the analyzing the remnant pattern further includes performing a visual inspection of the remnant pattern, and determining that the seal gap is within a preset tolerance when of a size of the remnant pattern is larger than a known reference.

In another form, the analyzing the remnant pattern further includes measuring a dimension of the remnant pattern, and determining that the seal gap is within a preset tolerance when the measured dimension exceeds a set threshold.

In yet another form, the dimension is at least one of a height or a width of the remnant pattern.

In one form, the liquid agent is a washable paint.

In one form, the present disclosure is directed toward a vehicular seal gap measuring method that includes printing, with a liquid agent, a mark on one of a panel or a vehicle body, closing the panel on the vehicle body, opening the panel, and assessing an interference between the panel and the vehicle body based on a remnant pattern formed on the other one of the panel and the vehicle body by the transfer of the liquid agent from the mark. The method further includes removing the liquid agent.

In another form, the assessing the interference includes performing a visual inspection of the remnant pattern, and determining that the interference is within a preset tolerance when of a size of the remnant pattern is larger than a known reference.

In yet another form, the assessing the interference further includes measuring a dimension of the remnant pattern, and determining that the interference is within a preset tolerance when the measured dimension exceeds a set threshold.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
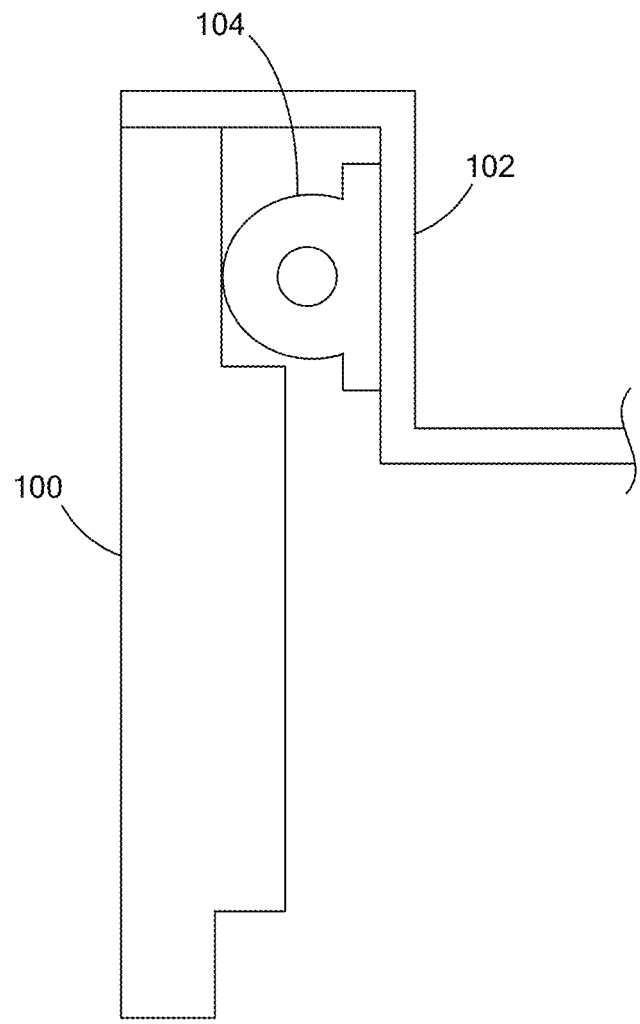
FIG. 1 illustrates a closing member and a fixed member having a seal disposed therebetween.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

To ensure the interference between a seal and a member that mates with the seal is within engineering specifications of a specific vehicle, methods and/or systems have been created to identify and quantify the interference of the seal. For example, U.S. Pat. No. 6,860,067, the disclosure of which is incorporated herein by reference, explains multiple methods for quantifying the interference. One such method includes spraying chalk on one of the mating members, closing the closure panel, opening the closure panel, and determining if chalk transferred to the other matting member. With the chalk test, the remanence of the chalk may potentially stain the mating surfaces. Other methods for quantifying the interference may require special equipment such as scanners and pressure measuring devices that avoid staining the mating surfaces, but may require additional time to perform.

The present disclosure is directed toward a method for measuring a seal gap that allows for accurate measurement of the interference without damaging the vehicle. Specifically, as described further herein, a liquid agent having specific viscus properties is used to indicate the seal gap and is removable to prevent staining of the mating surfaces, thereby preventing damage to the vehicle.

Referring to FIG. 1, a seal gap measurement system of the present disclosure is generally applicable to mating configurations in which one member is a closing member 100 (i.e., a closing panel) that is operable to open and close relative to a fixed member 102. A seal 104 is positioned between the members 100 and 102 to form a sealed region therebetween. In the figure, the seal 104 is attached to the fixed member 102, and directly interfaces or, in other words mates with, a surface of the closing member 100. However, other suitable configurations of the closing member, seal, and fixed member are also within the scope of the present disclosure. For example, the seal 104 can be attached to the closing member 100 to mate with the fixed member 102. In addition, the member that the seal 104 mates with can include a component that is configured to contact the seal, such as a weatherstrip.

In the following, a member from among the closing member and the fixed member that receives the liquid agent is referred to as a stamping member, and the other member is an imprinted member. The stamping member may also be referred to as first mating member and the imprinted member may be a second mating member.

Figure 2:
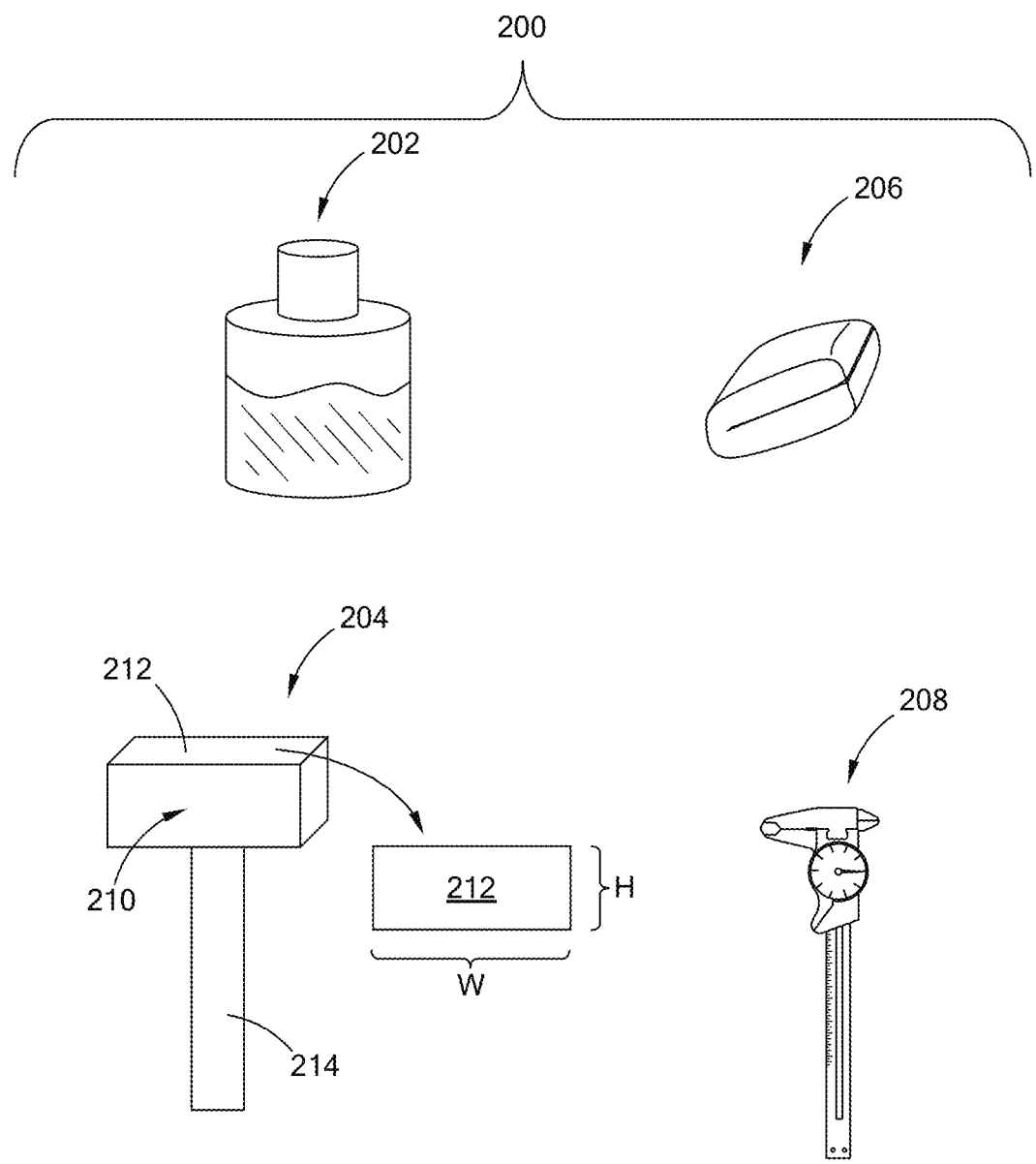
FIG. 2 illustrates a seal gap measurement system in accordance with the teachings of the present disclosure.

Referring to FIG. 2, a seal gap system 200 of the present disclosure includes a liquid agent 202, an applicator 204, a wiper 206, and a measurement device 208. In one form, the liquid agent 202 is a removable type of liquid and has a hue that is visually distinct from the members 100 and 102. The viscosity of the liquid agent 202 is selected such that the liquid is thick enough to retain a shape of the applicator 204 but wet enough that the liquid is transferable from one member to the other member to form a remnant pattern (i.e., a foot print) on the other member. In one form, the liquid agent 202 is provided as a washable paint having a contrasting color, such as green, yellow, etc. Other suitable liquids, such as gels or pastes, can also be used as the liquid agent.

The applicator 204 is used by an operator to apply the liquid agent 202 to the stamping member. In one form, the applicator 204 includes a head 210 having a stamping surface 212 and a handle 214. Dimensions of the stamping surface 212 of the head 210 are customizable and are based on specific measurement parameters and tolerances associated with a seal gap. For example, if an acceptable seal gap is defined as having a set threshold of a width (W) of 15 mm±3 mm and/or a height (H) of 7 mm±1 mm, the surface 212 may have a width of 15 mm and a height of 7 mm. The head 210 can be made of a reusable and/or recyclable material, or can be a disposable material. The stiffness of the head 210 is selected such that the material is soft enough to easily print the liquid agent on to the stamping member and hard enough to substantially retain the shape and measurement of the stamping surface 212. For example, the head 210 may be made of a foam material, a sponge like material, and/or a rubber/silicone like material.

The measurement device 208 is used to measure one or more dimensions of the remnant pattern on the imprinted member after the closing and opening of the closing member. For example, the dimension may include a width and/or height of the remnant pattern. In one form, the measurement device 208 is a caliper; however, other suitable measurement devices, such as a ruler, can also be used. The wiper 206 is operable to remove or erase the liquid agent 202 from the stamping member and the imprinted member once the measurements are taken. In one form, the wiper 206 includes a cloth that can be dampened with a solution like water or a cleaning product. The wiper 206 can be other suitable devices like a sponge and a squeegee.

Referring to FIGS. 3 and 4A to 4F, a seal gap measurement routine for measuring a seal gap between two mating surfaces is described. In FIGS. 4A to 4F, a closing member is a vehicle door 402 and a fixed member is a door opening 404 defined by the vehicle body. As pictured, a seal 406 is disposed along the door opening 404, and is arranged to seal a gap between the door 402 and the door opening 404 when the door 402 is closed. While the seal gap measurement routine is described in association with a door and door opening, the routine can be performed with other suitable closing and fixed members and should not be limited to vehicle doors.

Figure 3:
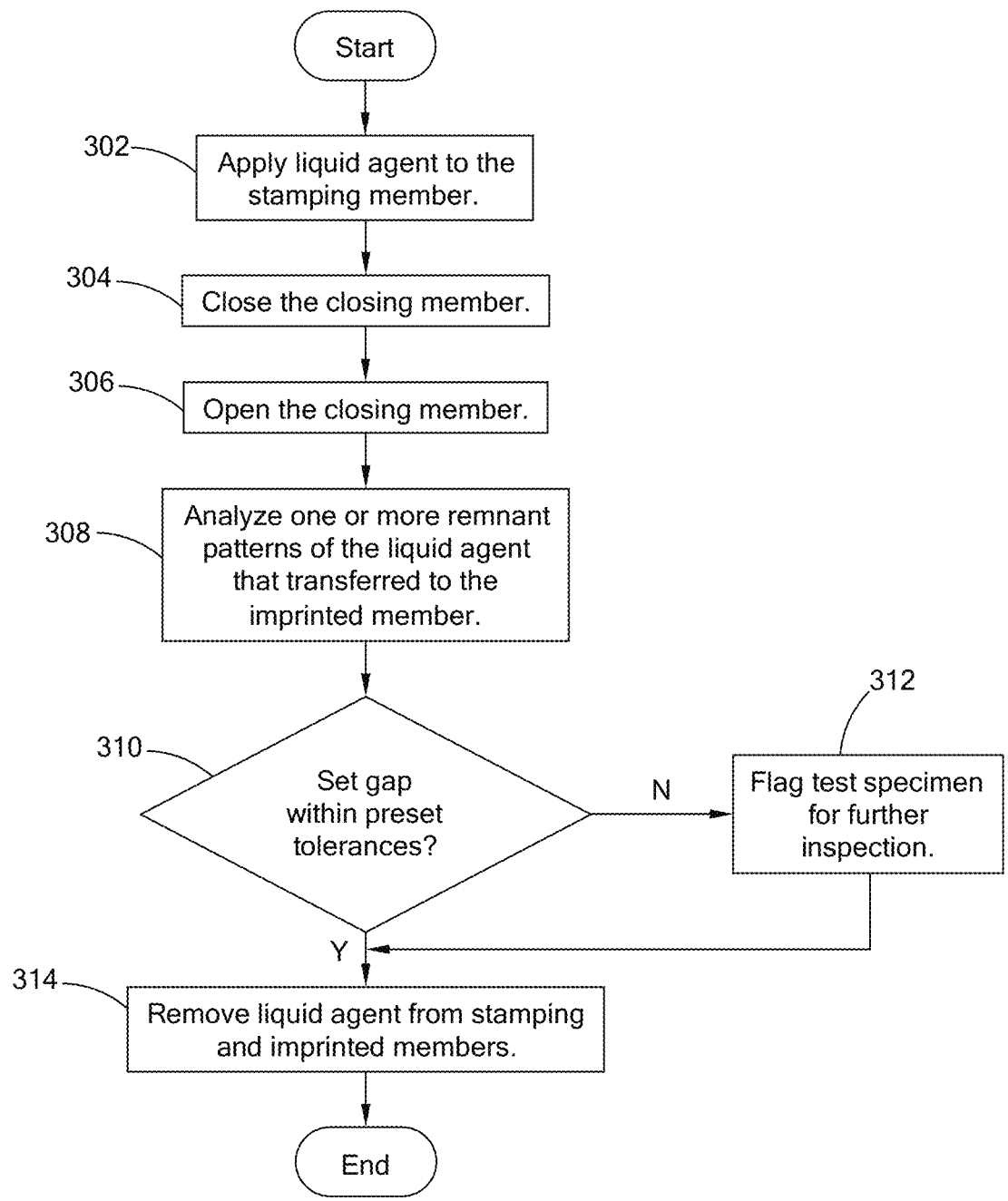
FIG. 3 is a flowchart of a seal gap measuring routine in accordance with the teachings of the present disclosure.

At 302 of FIG. 3, using an applicator, a liquid agent is applied to the one or more regions of the stamping member. For example, in one form, the liquid agent is applied to multiple designated characteristic regions along the stamping member to form multiple base marks. The designated characteristics regions are regions of interest for the particular interface being tested, and therefore, can vary based on the interface and even, vehicle type. For example, in FIGS. 4A and 4B, using an applicator 410, liquid agent (e.g., paint) is applied along the seal 406 attached to the door opening 404 (e.g., stamping member). As illustrated, the amount of liquid agent is sufficient to create a base mark 412 that substantially resembles the stamping surface of the applicator 410. While the base mark 412 is printed at four characteristics regions $414_1$-$414_4$ along the seal, any suitable number of base marks may be printed. Alternatively, in another form, the liquid agent is applied to the entire sealing surface of the stamping member to form one base mark instead of multiple segmented base marks. Accordingly, the seal gap throughout the sealing surface of the stamping member is tested.

At 304, the closing member is closed or in other words, is engaged with the fixed member. In one form, the closing member should be closed gently until the closing member is mating with the fixed member, and if applicable, latched to the vehicle. For example, referring to FIG. 4C, the door 402 (e.g. the closing member) is gently closed until it mates with the door opening 404 (e.g., fixed member), and pressure is slowly applied to the door 402 until it latches (i.e., couples or engages).

Figure 4A:
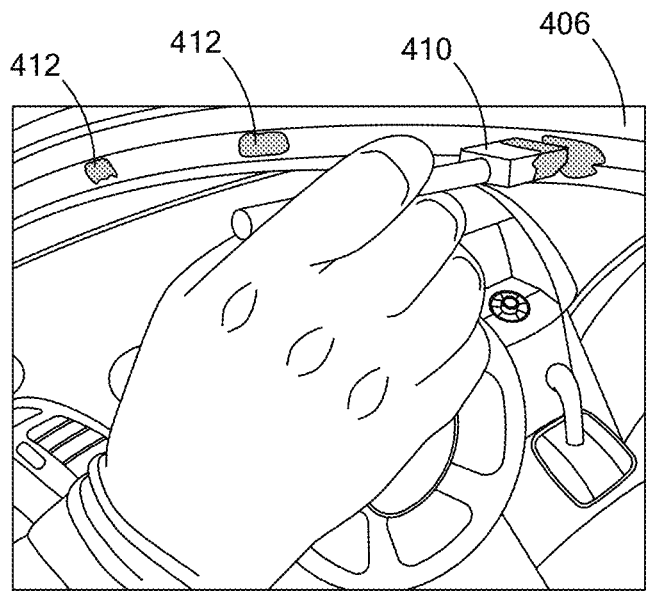
FIGS. 4A to 4F illustrate an example application of the seal gap measuring routine of FIG. 3.
Figure 4B:
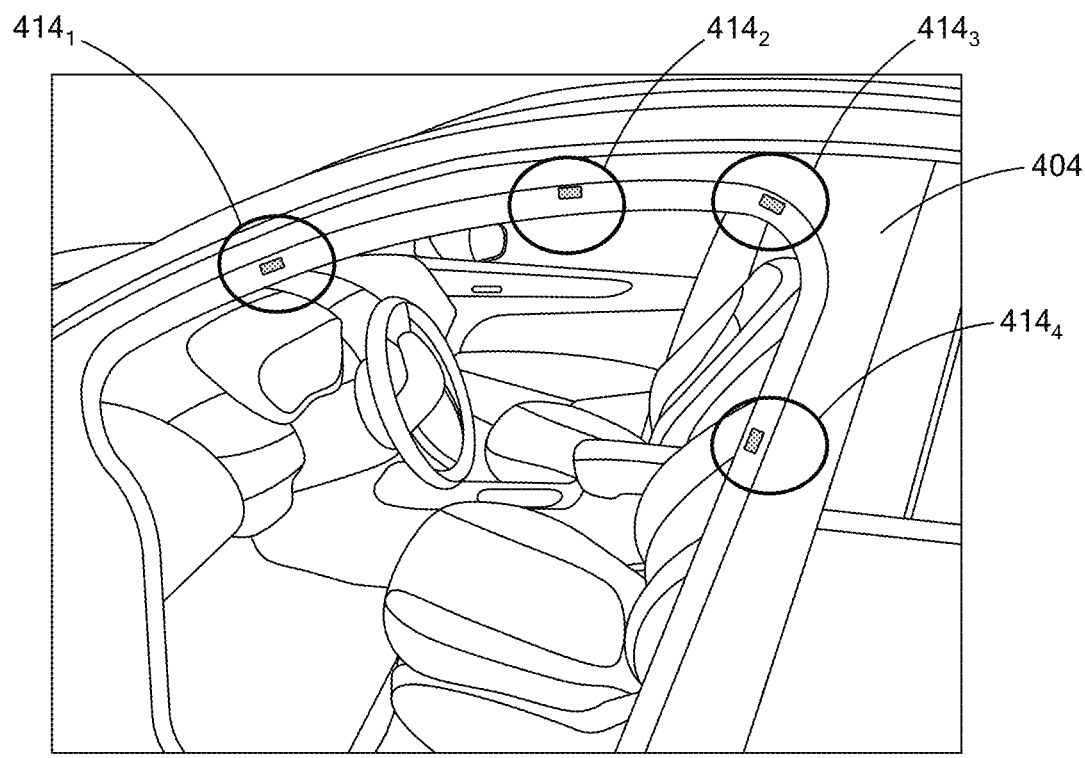
Figure 4C:
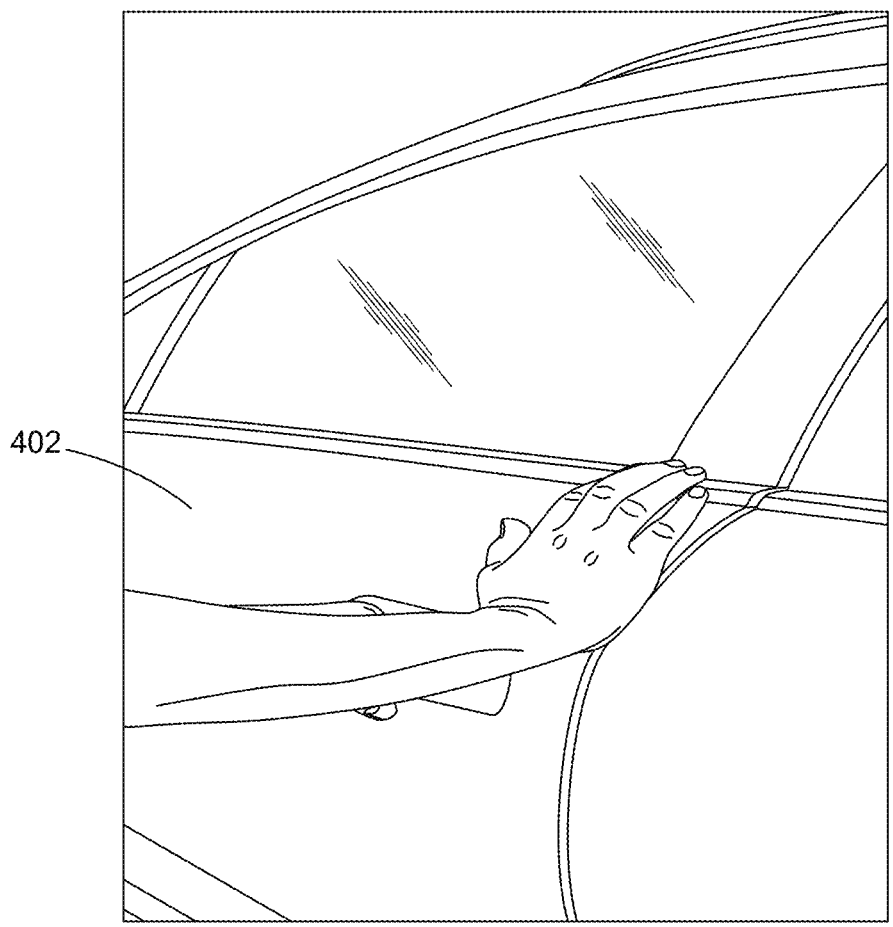
Figure 4D:
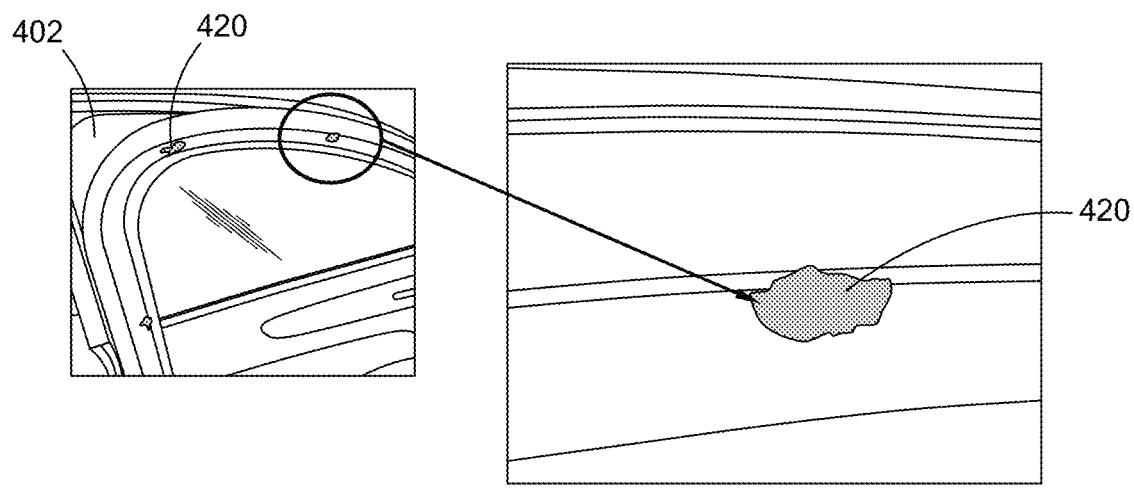
Figure 4E:
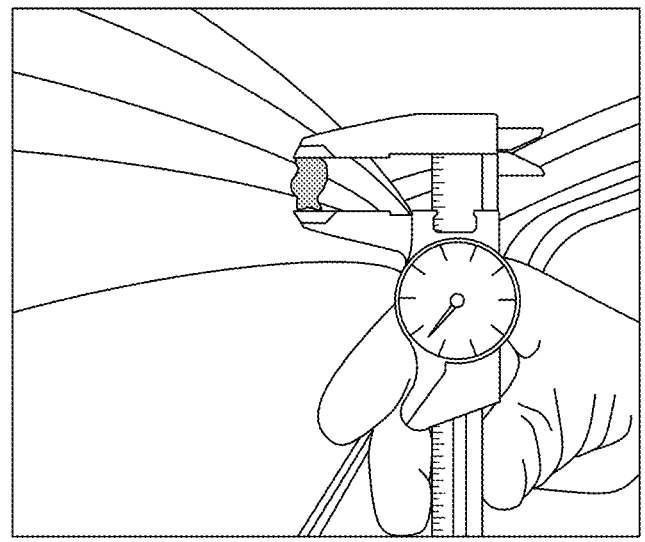
Figure 4F:
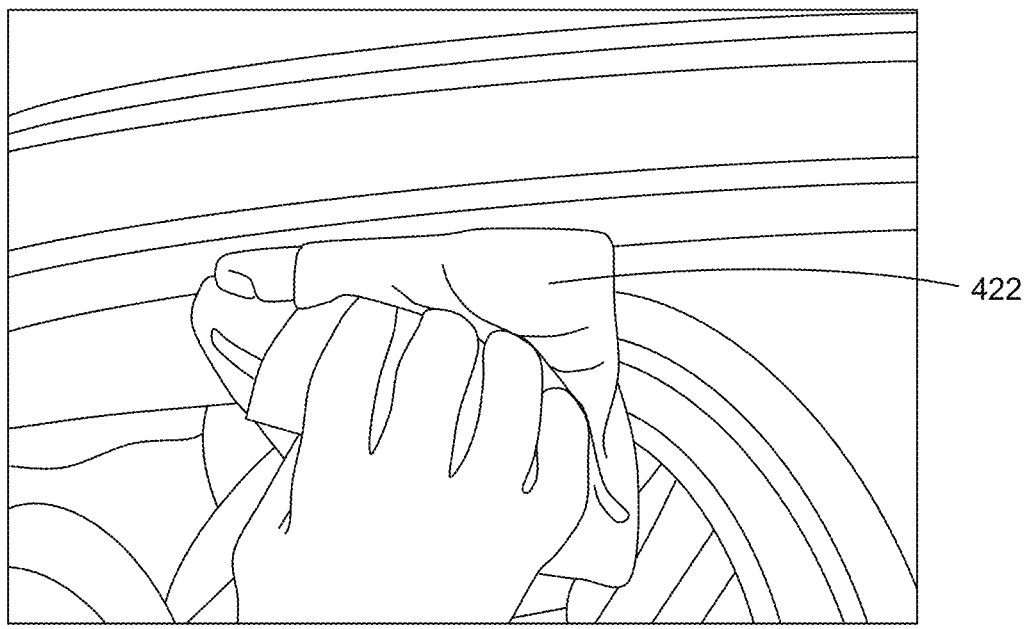

At 306, the closing member is opened, and at 308, remnant patterns on the imprinted member formed by the transfer of the liquid agent from the stamping member is analyzed. For example, in FIGS. 4D and 4E, the door 402 is opened and remnant patterns 420 are provided at one or more regions of the door that correspond with the base marks 412 printed at the characteristics regions of the door opening 404. In one form, the hue of the liquid agent allows for the remnant patterns to undergo a visual inspection in which an operator identifies remnants patterns that are smaller or larger than a known reference, such as the originally printed base mark, the stamping surface of the applicator, or a known shape. In another form, in addition to or in lieu of the visual inspection, one or more dimensions of the remnant patterns are measured using the measurement tool, as depicted in FIG. 4E.

At 310, it is determined whether the seal gap is within a preset based on the analysis of 308. For example, for the visual inspection, a remnant pattern that is smaller than that of the known reference (e.g., stamping surface of applicator) indicates insufficient interference between the door opening and the door (i.e., interference between two mating members) and thus, the seal gap is determined to be outside the preset tolerance. Alternatively, a remnant pattern that is larger than that of the known reference, indicates a sufficient interference between the door opening and the door, and thus, the seal gap is determined to be within the preset tolerance. In another form, when measuring the remnant patterns, the measured dimensions, such as the height and/or width, are compared to the set threshold to determine if the seal gap is within the preset tolerance. If the measured dimensions are greater than or equal to the set threshold, the seal gap is determined to be within the preset tolerance. Alternatively, if the measured dimensions are less than the set threshold, the seal gap is determined to be outside of the set tolerance. In one form, each of the remnant patterns are analyzed to determine if the seal gap at that characteristics region is within the preset tolerance range.

If the seal gap is within the preset tolerance, the test specimen (e.g., the vehicle) can be flagged for further inspection to address interference issue, at 312. For example, if more than one of the remnant patterns identifies an insufficient seal gap, the test specimen can be flagged for further inspection. In another example, if majority of the remnant patterns identify a sufficient seal gap, the test specimen may not be flagged for further inspection. Other suitable conditions for determining whether to flag a test specimen for further evaluation based on the analysis of the remnant patterns are also within the scope of the present disclosure.

If the seal gap is within the preset tolerance or after the test specimen is flagged, the liquid agent is removed from the stamping and imprinted members, at 314. For example, in FIG. 4F, a cloth 422 (i.e., a wiper) is used to remove the liquid agent from the door and the door opening. Thus, the vehicle is not disfigured or damaged.

The seal gap measurement method and/or routine measures the seal gap without damaging the vehicle. For example, using a washable or, in other words, removable liquid, remanence of the liquid is easily removed from the mating members by way of, for example, a damp cloth. Such operation does not leave residue like that commonly found with other processes, such as the chalk based measuring operation. The seal gap measurement method and/or system of the present disclosure visually highlights regions of the mating with potential seal gap concerns that can lead to wind noise, increased closure effort, and/or water leak, so that the seal can be adjusted to address these concerns.

The seal gap measurement method of the present disclosure is applicable to various suitable sealing interfaces for different types of vehicles. For example, the seal gap measurement method may be applied to closure panels and fixture members provided on passenger vehicles, tractors, buses, heavy-duty vehicles, and other suitable vehicles.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for measuring a seal gap between a closing member and a fixed member, the method comprising:
   imprinting, with an applicator having a stamping surface, a liquid agent having transferable properties along one or more regions of a stamping member to define one or more base marks, wherein dimensions of the one or more base marks are indicative of dimensions of the stamping surface of the applicator, and wherein the stamping member is one of the closing member and the fixed member;
   engaging the closing member with the fixed member;
   disengaging the closing member from the fixed member; and
   assessing a seal gap between the closing member and the fixed member based on one or more remnant patterns formed on an imprinted member that is the other one of the closing member and the fixed member, wherein the one or more remnant patterns are formed by the liquid agent transferred from the stamping member.

2. The method of claim 1 further comprising removing the liquid agent from the stamping member and the imprinted member after assessing the seal gap between the closing member and the fixed member.

3. The method of claim 1, wherein the assessing the seal gap further comprises:
performing a visual inspection of the one or more remnant patterns; and
determining that the seal gap is within a preset tolerance when a size of a remnant pattern among the one or more remnant patterns is larger than a known reference, wherein the known reference is based on at least one of the one or more base marks or the stamping surface of the applicator.

4. The method of claim 1, wherein the assessing the seal gap further comprises:
measuring a dimension of at least one of the one or more remnant patterns; and
determining that the seal gap is within a preset tolerance when the dimension of the at least one of the one or more remnant patterns exceeds a set threshold, wherein the set threshold are based on the dimensions of the stamping surface.

5. The method of claim 1, wherein the closing member and the fixed member are a door assembly and a door opening defined by a vehicle body, respectively.

6. The method of claim 1, wherein the liquid agent is a washable paint.

7. The method of claim 1, wherein the liquid agent is applied to a seal disposed on the stamping member.

8. A method for measuring a seal gap between a closing member and a fixed member, the method comprising:
printing, with an applicator having a stamping surface and a liquid agent, a base mark on a stamping member, wherein dimensions of the base mark is indicative of dimensions of the stamping surface of the applicator and the stamping member is one of the closing member and the fixed member;
closing the closing member onto the fixed member;
opening the closing member; and
analyzing a remnant pattern formed on an imprinted member by a transfer of the liquid agent from the base mark to measure the seal gap between the closing member and the fixed member, wherein the imprinted member is the other one of the closing member and the fixed member.

9. The method of claim 8 further comprising erasing the base mark and the remnant pattern after analyzing the remnant pattern.

10. The method of claim 8, wherein the base mark is printed directly on a surface of a seal that is attached to the stamping member.

11. The method of claim 8, wherein the remnant pattern is formed on a seal that is attached to the imprinted member.

12. The method of claim 8, wherein the closing member is the stamping member and the fixed member is the imprinted member.

13. The method of claim 8, wherein the closing member is the imprinted member and the fixed member is the stamping member.

14. The method of claim 8, wherein the analyzing the remnant pattern further comprises:
performing a visual inspection of the remnant pattern; and
determining that the seal gap is within a preset tolerance when of a size of the remnant pattern is larger than a known reference, wherein the known reference is based on the base mark or the stamping surface of the applicator.

15. The method of claim 8, wherein the analyzing the remnant pattern further comprises:
measuring a dimension of the remnant pattern; and
determining that the seal gap is within a preset tolerance when the dimension of the remnant pattern exceeds a set threshold, wherein the set threshold are based on the dimensions of the stamping surface.

16. The method of claim 15, wherein the dimension of the remnant pattern is at least one of a height or a width of the remnant pattern.

17. The method of claim 8, wherein the liquid agent is a washable paint.

18. A vehicular seal gap measuring method comprising:
printing, with an applicator having a stamping surface and a liquid agent, a mark on one of a panel or a vehicle body, wherein dimensions of the mark is indicative of dimensions of the stamping surface of the applicator;
closing the panel on the vehicle body;
opening the panel;
assessing an interference between the panel and the vehicle body based on a remnant pattern formed on the other one of the panel and the vehicle body by a transfer of the liquid agent from the mark; and
removing the liquid agent after assessing the interference between the panel and the vehicle body.

19. The method of claim 18, wherein the assessing the interference further comprises:
performing a visual inspection of the remnant pattern; and
determining that the interference is within a preset tolerance when of a size of the remnant pattern is larger than a known reference, wherein the known reference is based on at least one of the mark or the stamping surface of the applicator.

20. The method of claim 18, wherein the assessing the interference further comprises:
measuring a dimension of the remnant pattern; and
determining that the interference is within a preset tolerance when the dimension of the remnant pattern exceeds a set threshold, wherein the set threshold is based on the dimensions of the stamping surface.

* * * * *